United States Patent
A et al.

(10) Patent No.: US 11,212,163 B1
(45) Date of Patent: Dec. 28, 2021

(54) SYSTEMS AND METHODS FOR DEADLOCK AVOIDANCE WITHIN MPLS NETWORKS

(71) Applicant: Juniper Networks, Inc., Sunnyvale, CA (US)

(72) Inventors: Vamsi Krishna A, Sunnyvale, CA (US); Venkata Ramana P, Sunnyvale, CA (US); Viswanath K J, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

(21) Appl. No.: 16/588,713

(22) Filed: Sep. 30, 2019

(51) Int. Cl.
*H04L 12/24* (2006.01)
*H04L 12/26* (2006.01)

(52) U.S. Cl.
CPC .......... *H04L 41/0654* (2013.01); *H04L 43/10* (2013.01)

(58) Field of Classification Search
CPC ... H04L 41/0654; H04L 43/10; H04L 45/026; H04L 45/50; H04L 45/28; H04L 43/0811; H04L 43/103
See application file for complete search history.

(56) References Cited

U.S. PATENT DOCUMENTS

| 10,193,746 | B2 | 1/2019 | A et al. | |
|---|---|---|---|---|
| 2012/0063325 | A1* | 3/2012 | Zhao | H04L 45/50 370/241.1 |
| 2013/0114394 | A1* | 5/2013 | Hu | H04L 43/103 370/216 |
| 2016/0036695 | A1* | 2/2016 | Mirsky et al. | H04L 41/0654 370/243 |
| 2018/0176075 | A1* | 6/2018 | A | H04L 43/0811 |

OTHER PUBLICATIONS

D. Katz, D. Ward, IETF RFC 5880: "Bidirectional Forwarding Detection (BFD)", 2010, pp. 3-6, Sections 1, 2, 3. (Year: 2010).*
Juniper Networks, "Understanding Ethernet OAM Connectivity Fault Management for Switches", URL: https://www.juniper.net/documentation/en_US/junos/topics/concept/cfm-ethernet-oam-ex-series.html, Oct. 22, 2018, 5 pages.
Wikipedia, "Type-length-value", URL: https://en.wikipedia.org/wiki/Type-length-value, Sep. 13, 2006, 3 pages.
Juniper Networks, "Understanding MPLS Layer 2 Circuits", URL: https://www.juniper.net/documentation/en_US/junos/topics/concept/mpls-security-layer-2-circuit-understanding.html, Jul. 11, 2018, 3 pages.

* cited by examiner

*Primary Examiner* — Huy D Vu
*Assistant Examiner* — Robert Ma
(74) *Attorney, Agent, or Firm* — FisherBroyles, LLP

(57) ABSTRACT

The disclosed method may include (1) detecting, within at least one interface of a first endpoint device, a connectivity failure that disrupts a Layer 2 service based on an MPLS connection between the interface of the first endpoint device and at least one interface of a second endpoint device, (2) in response to detecting the connectivity failure, sending, to the second endpoint device, a first bidirectional BFD packet that prompts the second endpoint device to at least partially disable the interface of the second endpoint device, (3) determining that the connectivity failure has been corrected, and then (4) re-establishing the Layer 2 service based on the MPLS connection by sending, to the second endpoint device, a second BFD packet that prompts the second endpoint device to re-enable the interface of the second endpoint device. Various other apparatuses, systems, and methods are also disclosed.

20 Claims, 10 Drawing Sheets

SYSTEMS AND METHODS FOR DEADLOCK AVOIDANCE WITHIN MPLS NETWORKS

BACKGROUND

As defined by the Institute of Electrical and Electronics Engineers, Connectivity Fault Management (CFM) is a standard for fault detection services within networks and network devices. In accordance with this standard, a CFM session may be established between two endpoint devices connected by a network link. This CFM session may facilitate and/or involve sending Continuity Check Messages (CCMs) between the endpoint devices on a periodic basis. In some examples, a CCM may assess and/or verify the operational status of the network link.

As an example, a CFM session may detect a connectivity failure within an interface of a first device and then forward a CCM indicating the failure to a second device. In response to the CCM, the second device may bring down (e.g., take offline) all or a portion of its own interfaces. As such, other network devices may re-route traffic that was to be forwarded along a network link between the two devices, thereby ensuring that the traffic is not directed to an unreachable interface of the first device. After the connectivity failure has been fixed or mitigated, the CFM session may attempt to restore the functionality of the second device. For example, the CFM session may forward, to the second device, an additional CCM that prompts the second device to re-enable its disabled interfaces. Unfortunately, in some cases, the second device may be unable to receive the CCM (e.g., as a result of disabling interfaces that are capable of handling the CCM). As such, the second device may not be prompted to re-enable the disabled interfaces and the network link between the devices may be severed or otherwise unusable. Such a situation may be referred to as a deadlock.

Deadlocks may be created more frequently (or may be especially difficult to prevent) within certain types of networks. For example, a CFM session running within two peer devices connected by a Label-Switched Path (LSP) may forward CCMs via a Layer 2 service (or multiple Layer 2 services) based on a Multiprotocol Label Switching (MPLS) protocol. This CFM session may bring down Layer 2 MPLS services on one device in response to a connectivity failure within the other device. Thus, the device with disabled Layer 2 MPLS services may be unable to receive subsequent CCM packets. Because many traditional fault-monitoring systems may be unable to restore the Layer 2 MPLS services between the two devices without receiving a CCM indicating that the failure is corrected, these systems may enable and/or perpetuate deadlocks within MPLS networks.

The instant disclosure, therefore, identifies and addresses a need for systems and methods for deadlock avoidance within MPLS networks.

SUMMARY

As will be described in greater detail below, the present disclosure generally relates to systems and methods for deadlock avoidance within MPLS networks. In one example, a computer-implemented method for accomplishing such a task may include (1) detecting, within at least one interface of a first endpoint device, a connectivity failure that disrupts a Layer 2 service based on an MPLS connection between the interface of the first endpoint device and at least one interface of a second endpoint device, (2) in response to detecting the connectivity failure, sending, to the second endpoint device, a first bidirectional forwarding detection (BFD) packet that prompts the second endpoint device to at least partially disable the interface of the second endpoint device, (3) determining that the connectivity failure has been corrected, and then (4) establishing the Layer 2 service based on the MPLS connection by sending, to the second endpoint device, a second BFD packet that prompts the second endpoint device to re-enable the interface of the second endpoint device.

As another example, a system for implementing the above-described method may include various modules stored in memory. The system may also include at least one hardware processor that executes these modules. For example, the system may include (1) a detection module that detects, within at least one interface of a first endpoint device, a connectivity failure that disrupts a Layer 2 service based on an MPLS connection between the interface of the first endpoint device and at least one interface of a second endpoint device, (2) a determination module that determines that the connectivity failure has been corrected, and (3) a sending module that (A) in response to detecting the connectivity failure, sends, to the second endpoint device, a first BFD packet that prompts the second endpoint device to at least partially disable the interface of the second endpoint device and (B) in response to determining that the connectivity failure has been corrected, re-establishes the Layer 2 service based on the MPLS connection by sending, to the second endpoint device, a second BFD packet that prompts the second endpoint device to re-enable the interface of the second endpoint device.

As a further example, a non-transitory computer-readable medium may include one or more computer-readable instructions that, when executed by at least one processor of a computing device, cause the computing device to (1) detect, within at least one interface of a first endpoint device, a connectivity failure that disrupts a Layer 2 service based on an MPLS connection between the interface of the first endpoint device and at least one interface of a second endpoint device, (2) in response to detecting the connectivity failure, send, to the second endpoint device, a first BFD packet that prompts the second endpoint device to at least partially disable the interface of the second endpoint device, (3) determine that the connectivity failure has been corrected, and then (4) re-establish the Layer 2 service based on the MPLS connection by sending, to the second endpoint device, a second BFD packet that prompts the second endpoint device to re-enable the interface of the second endpoint device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
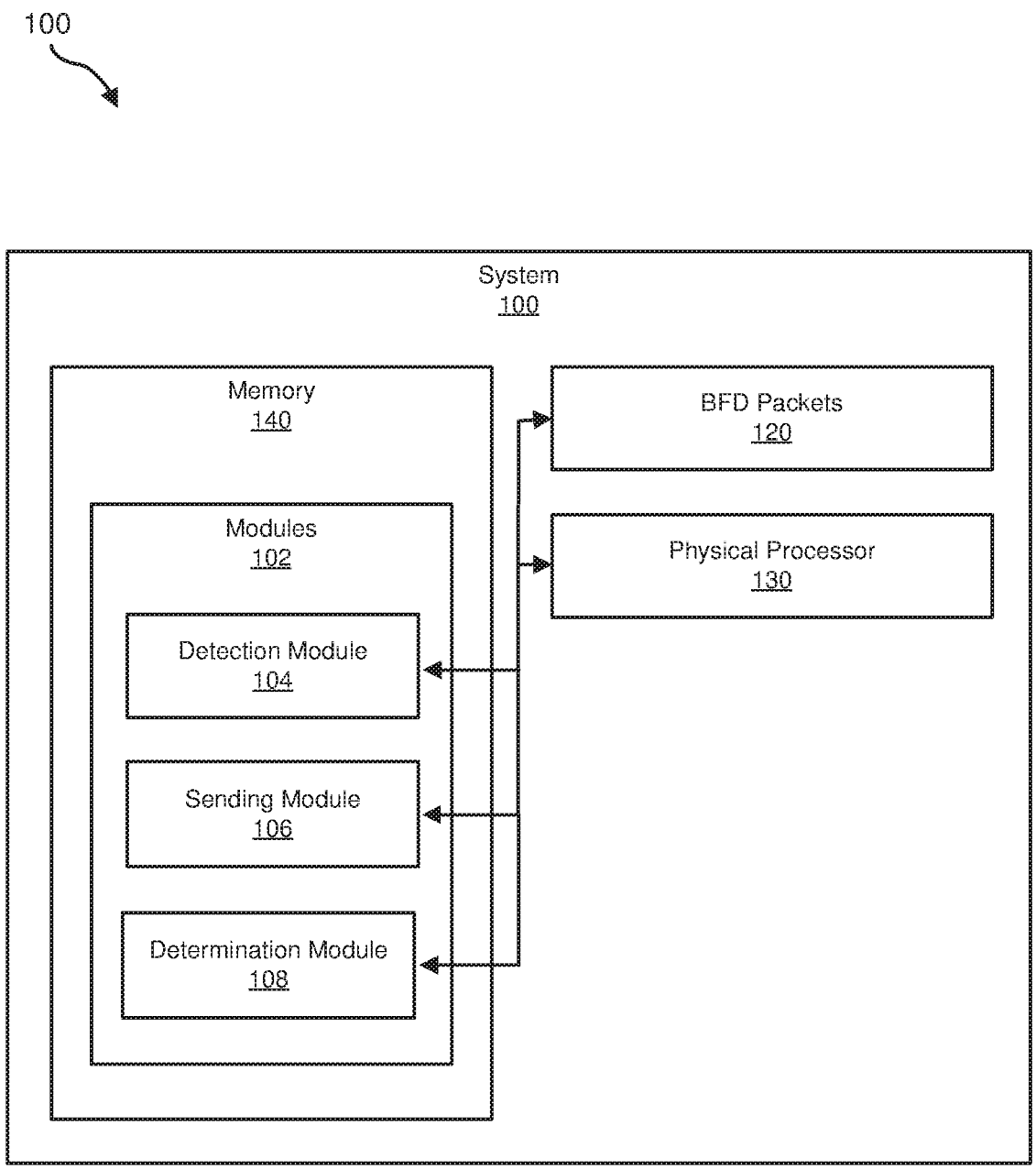
FIG. 1 is a block diagram of an exemplary system for deadlock avoidance within MPLS networks.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure describes various systems and methods for deadlock avoidance within MPLS networks. Embodiments of the instant disclosure may prevent deadlock situations between two endpoint devices on either side of an MPLS link that supports a Layer 2 service by maintaining a BFD session across an MPLS LSP between the devices while the Layer 2 service is disabled, broken, and/or offline. For example, after detecting a connectivity failure that disrupts a Layer 2 service at one device, the disclosed systems and methods may forward a BFD packet indicating the failure to the second device. In response to the BFD packet, the second device may disable all or a portion of its own Layer 2 services such that other network devices do not direct Layer 2 traffic to the first device via the MPLS link. After the connectivity failure is fixed, the disclosed systems and methods may forward, to the second device, an additional BFD packet that triggers the second device to re-enable its Layer 2 services. Thus, the devices may resume full operation and the Layer 2 service based on the MPLS link may be restored.

By establishing a BFD session between two peer endpoint devices, embodiments of the instant disclosure may maintain and/or facilitate communication between the devices even when a Layer 2 service based on an MPLS connection between the devices is disabled or broken. As such, the disclosed systems and methods may enable devices within MPLS networks to run and restore CFM sessions following connectivity failures that would generally create deadlocks within traditional fault-monitoring systems.

Figure 2:
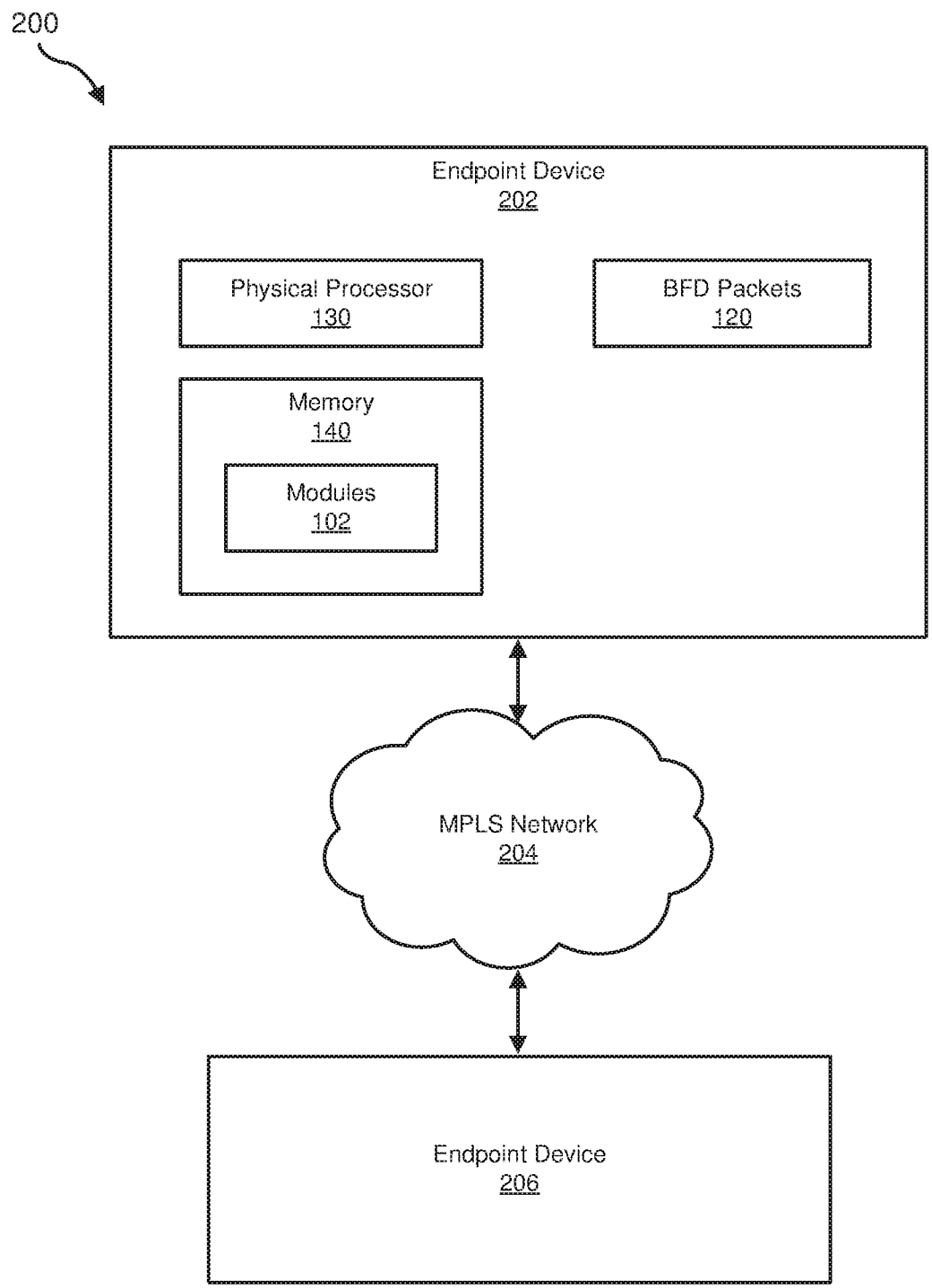
FIG. 2 is a block diagram of an additional exemplary system for deadlock avoidance within MPLS networks.
Figure 3:
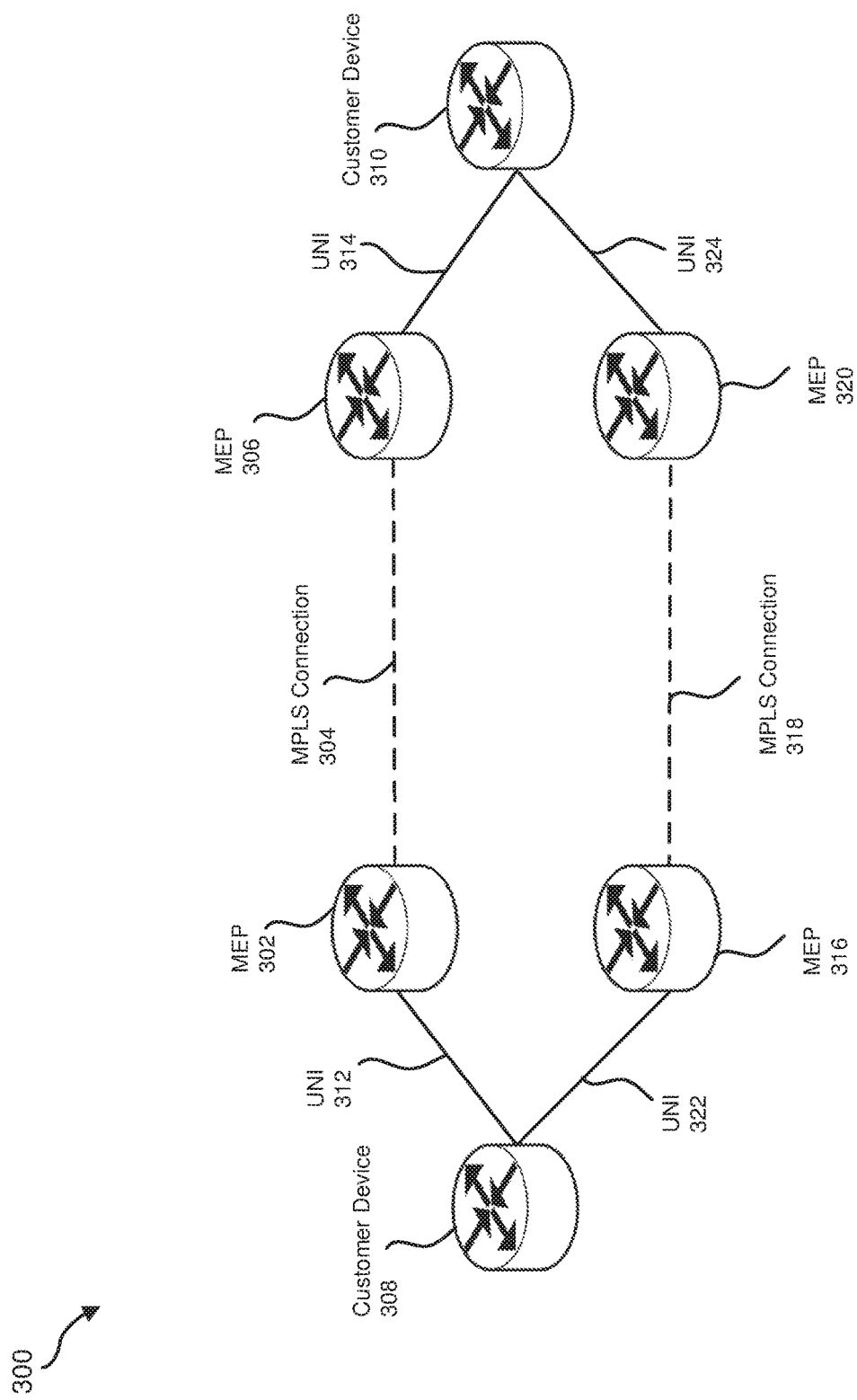
FIG. 3 is a block diagram of an additional exemplary system for deadlock avoidance within MPLS networks.

The following will provide, with reference to FIGS. 1-3, detailed descriptions of exemplary systems for deadlock avoidance within MPLS networks. Detailed descriptions of exemplary BFD packets that facilitate deadlock avoidance within MPLS networks will be provided in connection with FIG. 5. Detailed descriptions of exemplary implementations for deadlock avoidance within MPLS networks will be provided in connection with FIGS. 6-9. Detailed descriptions of corresponding computer-implemented methods will be provided in connection with FIG. 4. In addition, detailed descriptions of an exemplary computing system for carrying out these methods will be provided in connection with FIG. 10.

FIG. 1 is a block diagram of an exemplary system 100 for deadlock avoidance within MPLS networks. As illustrated in this figure, exemplary system 100 may include one or more modules 102 for performing one or more tasks. As will be explained in greater detail below, modules 102 may include a detection module 104, a sending module 106, and a determination module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., endpoint device 202 and/or endpoint device 206). In addition, one or more of modules 102 may perform any of the functionality described herein in connection with any of the devices illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate deadlock avoidance within MPLS networks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, system 100 may also include one or more BFD packets, such as BFD packets 120. BFD packets 120 may represent and/or include any type or form of packet that is formatted and/or forwarded at least partially in accordance with a BFD protocol. In some examples, BFD packets may be used to detect connectivity faults between two network devices. As will be explained in greater detail below, the disclosed systems may utilize BFD packets to maintain communication between two network devices after Layer 2 services based on an MPLS link between the network devices is disrupted. For example, the disclosed systems may insert, into BFD packets 120, information indicating the operational status of one or more interfaces of the network devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include an endpoint device 202 in communication with an endpoint device 206 via an MPLS network 204. In one example, all or a portion of the functionality of modules 102 may be performed by endpoint device 202, endpoint device 206, and/or any other suitable computing system. As will be described in greater detail below, one or more of modules 102 from FIG. 1 may, when executed by at least one processor of endpoint device 202, enable endpoint device 202 to avoid deadlocks between endpoint device 202 and endpoint device 206.

Endpoint devices 202 and 206 generally represent any type or form of computing devices that facilitate communication within a network and/or across networks. In some examples, endpoint devices 202 and/or 206 may include and/or represent physical computing devices. In other examples, endpoint devices 202 and/or 206 may include and/or represent virtual (e.g., software-based) computing devices that are hosted by one or more physical computing devices. Examples of endpoint devices 202 and/or 206 include, without limitation, network devices, routers (such as a customer edge router, a provider edge router, a hub router, a spoke router, an autonomous system boundary router, and/or an area border router), switches, hubs, modems, bridges, repeaters, gateways, multiplexers, network adapters, network interfaces, servers, portions of one or more of the same, combinations or variations of one or more of the same, and/or any other suitable computing device.

In one embodiment, endpoint devices 202 and/or 206 may represent maintenance endpoint (MEP) devices. The terms "MEP" and "MEP device," as used herein, generally refer to any type or form of network device (or portion of a network device) that detects and/or handles connectivity faults within one or more network connections. In some embodiments, an MEP device may represent and/or include a network device that operates in accordance with the IEEE 802.1ag standard for Operation, Administration, and Management (OAM). In these embodiments, the MEP device may be configured to run a CFM session. A CFM session running within an MEP device may periodically send CCMs to a CFM session running within one or more peer MEP devices. The CFM session may also periodically receive CCMs from all or a portion of the peer MEP devices. In some embodiments, a CCM may indicate the operational status (e.g., either functional or non-functional) of one or more ports, connections, and/or components of an MEP device. Thus, CCMs distributed between two peer MEP devices may represent and/or correspond to heartbeat messages that assess and/or indicate the health and/or status of connections between the MEP devices.

In some examples, an MEP device may reside within a maintenance domain. The term "maintenance domain," as used herein, generally refers to a portion of a network that is owned, operated, and/or managed by a particular entity (e.g., an enterprise, organization, application, individual, etc.). In some embodiments, an MEP device may reside at the edge of a maintenance domain. For example, an MEP device may be positioned at the boundary of a maintenance domain such that the MEP device interfaces directly with one or more network devices (such as a customer edge device) external to the maintenance domain. For example, an MEP device may include one or more user-network interfaces (UNIs) that connect the MEP device with one or more customer edge devices. A UNI may include and/or represent an Ethernet cable, a fiber optic cable, all or a portion of an interface card, a port, a software-based interface, or any other suitable interface. In some embodiments, an MEP device may also communicate with one or more MEP devices and/or Maintenance Intermediate Point (MIP) devices.

MPLS network 204 generally represents any medium or architecture capable of facilitating communication or data transfer via one or more LSPs and/or MPLS protocols. In one example, MPLS network 204 may facilitate communication between endpoint device 202 and endpoint device 206. MPLS network 204 may facilitate communication or data transfer using wireless and/or wired connections. In addition, MPLS network 204 may facilitate and/or utilize a variety of Layer 2 networks, protocols and/or services, such as Ethernet over MPLS, Layer 2 circuit, Layer 2 Virtual Private Network (VPN), Ethernet VPN, and/or Virtual Private Local Area Network Service (VPLS) services. Although illustrated as being external to MPLS network 204 in FIG. 2, endpoint device 202 and endpoint device 206 may each represent a portion of MPLS network 204 and/or be included in MPLS network 204.

Although not illustrated in FIG. 2, endpoint device 202 and endpoint device 206 may communicate via one or more additional types of networks, links, tunnels, protocols, etc. Examples of these connections include, without limitation, a Wide Area Network (WAN), a Local Area Network (LAN), a Personal Area Network (PAN), the Internet, Power Line Communications (PLC), a cellular network (e.g., a Global System for Mobile Communications (GSM) network), a resource RSVP-TE network, portions of one or more of the same, variations or combinations of one or more of the same, and/or any other suitable network.

FIG. 3 illustrates an exemplary system 300 for deadlock avoidance within MPLS networks. Specifically, system 300 shows an exemplary configuration of MEP devices that provide connectivity fault monitoring for one or more customer edge devices. As shown in FIG. 3, system 300 may include an MEP 302 and an MEP 306. In one example, MEP 302 and MEP 306 may correspond to and/or be hosted by endpoint device 202 and endpoint device 206 in FIG. 2, respectively. In this example, MEPs 302 and/or 306 may host all or a portion of modules 102. In some embodiments, MEPs 302 and 306 may represent peer MEP devices. For example, these devices may be part of the same maintenance domain and/or managed by the same maintenance association. In addition, MEPs 302 and 306 may be connected by an MPLS connection 304. In some embodiments, Layer 2 services (e.g., services that operate via a data link layer in accordance with the Open Systems Interconnection (OSI) model) supported by MEPs 302 and 306 may facilitate transferring customer data packets via MPLS connection 304. For example, MPLS connection 304 may facilitate communication between a customer device 308 and a customer device 310. As shown in FIG. 3, customer device 308 may interface with MEP 302 via a UNI 312. Similarly, customer device 310 may interface with MEP 306 via a UNI 314.

System 300 may also include an MEP 316 and an MEP 320. As shown in FIG. 3, MEPs 316 and 320 may facilitate communication between customer device 308 and customer device 310 via an MPLS connection 318. As also shown in FIG. 3, customer device 308 may interface with MEP 316 via a UNI 322 and customer device 310 may interface with MEP 320 via a UNI 324. In some embodiments, MEPs 316 and 320 may represent peer MEP devices that reside within a different maintenance domain than MEPs 302 and 306. In addition, MPLS connection 318 may represent and/or serve as a back-up or secondary connection for MPLS connection 304. For example, MPLS connection 318 may facilitate communication between customer device 308 and customer device 310 in the event of a failure that disrupts and/or disables MPLS connection 304.

In some embodiments, MEPs 302 and 306 may run and/or be configured with a CFM session. Notably, in some examples, the disclosed systems may not alter, disrupt, or otherwise interfere with a standard CFM session running within these MEPs. However, one or more of modules 102 may monitor and/or communicate with such a CFM session. In one embodiment, the CFM session running within MEPs 302 and 306 may direct and/or enable MEPs 302 and 306 to periodically (e.g., every minute, every five minutes, etc.) transmit CCMs to one another. In some examples, the CFM session may detect a failure of UNI 312. For example, in the event that UNI 312 includes or is composed of a physical cable, the CFM session may determine that the cable has been damaged and/or disconnected. The CFM session may detect any additional or alternative type of failure that prevents customer data packets from being transmitted between customer device 308 and customer device 310 via UNI 312.

In response to detecting the failure within UNI 312, the CFM session may send, via MPLS connection 304, a CCM to MEP 306 describing the failure. For example, the CFM session may send a CCM that includes a network identifier of UNI 312 and an indication that UNI 312 is offline. In some embodiments, this CCM may successfully reach MEP 306 via MPLS connection 304. For example, the CFM session may send the CCM before the failure within UNI 312 disrupts and/or disables Layer 2 services based on MPLS connection 304. In the event that the CCM reaches MEP 306, the CFM session running within MEP 306 may disable UNI 314. For example, the CCM may prompt the CFM session to execute a CFM action profile that takes UNI 314 offline. In general, executing a CFM action profile may involve performing a certain action (such as taking a UNI offline or bringing the UNI online) in response to a certain event (such as another UNI going offline or coming back online). In some embodiments, the CCM sent by MEP 302 may not reach MEP 306 (e.g., due to Layer 2 services based on MPLS connection 304 being disabled before the CCM is transmitted). In these embodiments, MEP 306 may take UNI 314 offline in response to not receiving CCM packets from MEP 302 (e.g., within a certain amount of time).

In some examples, taking UNI 314 offline may disable and/or prevent MPLS, Layer 2 circuit, Layer 2 VPN, Ethernet VPN, VPLS, and/or similar types of services at UNI 314. Additionally or alternatively, taking UNI 314 offline may render UNI 314 invisible and/or unavailable within a network. For example, taking UNI 314 offline may prevent MEP 306 and/or UNI 314 from advertising UNI 314 to other network components and devices. Accordingly, customer device 310 may route Layer 2 traffic destined to customer device 308 via MEPs 316 and 320 instead of via MEPs 302 and 306. Because the failure within UNI 312 prevents Layer 2 MPLS packets from reaching customer device 308 via MEP 302, taking UNI 314 offline (and therefore causing Layer 2 MPLS packets destined for customer device 308 to be re-routed) may ensure that the packets successfully reach customer device 308.

Unfortunately, disabling UNI 314 may create a deadlock between MEP 302 and MEP 306. The term "deadlock," as used herein, generally refers to any permanent or semi-permanent connectivity failure between two peer MEPs following the execution of an action profile that takes one or more interfaces of the MEPs offline. For example, when the failure within UNI 312 is corrected, the CFM session running within MEP 302 may attempt to re-establish Layer 2 services based on MPLS connection 304 by sending, to MEP 306, one or more CCMs indicating that UNI 312 is online. However, because Layer 2 MPLS services at UNI 314 have been disabled, the CCM packets (which are transmitted via a Layer 2 service), may not be received at MEP 306. Thus, a traditional CFM session running within MEP 302 may be unable to re-establish Layer 2 services based on MPLS connection 304, thereby creating a deadlock between the MEPs. As will be explained in greater detail below, the disclosed systems and methods may prevent such deadlocks by transmitting one or more BFD packets between peer MEP devices while Layer 2 services between the peer MEP devices are disrupted.

Figure 4:
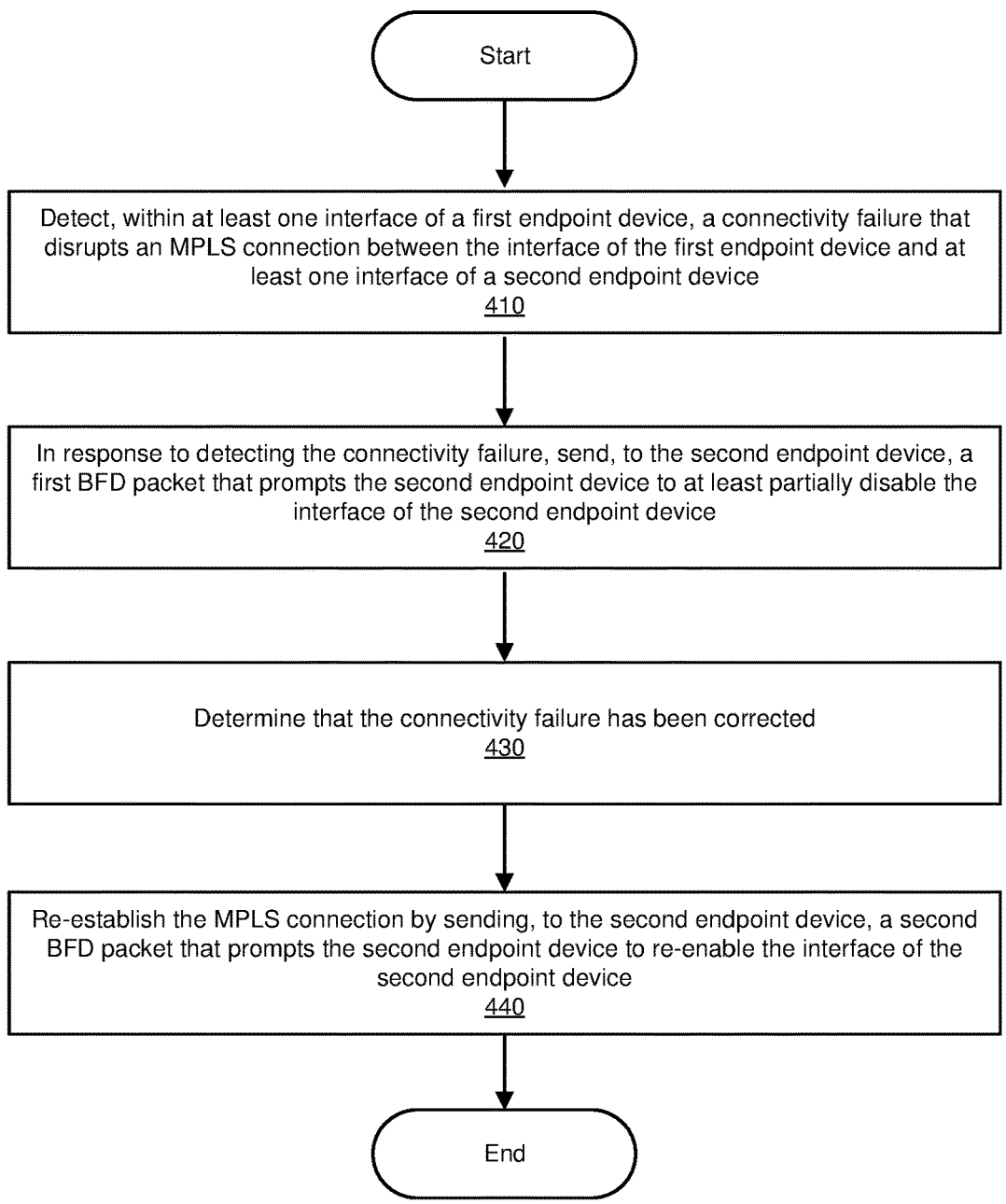
FIG. 4 is a flow diagram of an exemplary method for deadlock avoidance within MPLS networks.

FIG. 4 is a flow diagram of an example computer-implemented method 400 for deadlock avoidance within MPLS networks. The steps shown in FIG. 4 may be performed by any suitable computer-executable code and/or computing system, including system 100 in FIG. 1, system 200 in FIG. 2, system 300 in FIG. 3, implementation 600 in FIG. 6, implementation 700 in FIG. 7, implementation 800 in FIG. 8, and/or implementation 900 in FIG. 9. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may detect, within at least one interface of a first endpoint device, a connectivity failure that disrupts a Layer 2 service based on an MPLS connection between the interface of the first endpoint device and at least one interface of a second endpoint device. For example, detection module 104 may, as part of endpoint device 202 in FIG. 2, detect a connectivity failure that disrupts a Layer 2 service based on MPLS network 204. In another example, detection module 104 may, as part of MEP 302 in FIG. 3, detect a connectivity failure that disrupts a Layer 2 service based on MPLS connection 304.

The systems described herein may perform step 410 in a variety of ways and/or contexts. In some examples, detection module 104 may monitor UNI 312, MEP 302, and/or MPLS connection 304 to detect when UNI 312 is experiencing a connectivity failure. For example, detection module 104 may periodically or continuously query, assess, or otherwise monitor the ability of UNI 312 to transfer packets between customer device 308 and MEP 302. In one embodiment, detection module 104 may monitor UNI 312 directly (e.g., as part of software and/or hardware coupled to UNI 312). Additionally or alternatively, detection module 104 may monitor UNI 312 indirectly (e.g., by monitoring a CFM session within MEP 302 to detect when the CFM session generates a CCM indicating that UNI 312 is offline).

Detection module 104 may detect various types of connectivity failures within UNI 312. For example, in the event that UNI 312 includes or is composed of a fiber optic cable, detection module 104 may detect a physical failure or disconnection of the cable. In the event that UNI 312 is at least partially software-based, detection module 104 may detect an error or malfunction within the software that facilitates operation of UNI 312. Additionally or alternatively, detection module 104 may determine that UNI 312 has been temporarily disabled by a network administrator (e.g., for maintenance).

In some embodiments, detection module 104 may detect that multiple UNIs within MEP 302 are experiencing a connectivity failure. For example, a maintenance domain within MEP 302 may include more than one UNI and detection module 104 may determine that all or a portion of these UNIs are experiencing a related failure. Additionally or alternatively, detection module 104 may determine that the physical computing device that hosts all or a portion of MEP 302 is malfunctioning. In such cases, each UNI of MEP 302 may be experiencing a connectivity failure.

Returning to FIG. 4, at step 420 one or more of the systems described herein may, in response to detecting the connectivity failure, send, to the second endpoint device, a first BFD packet that prompts the second endpoint device to at least partially disable the interface of the second endpoint device. For example, sending module 106 may, as part of endpoint device 202 in FIG. 2, send, to endpoint device 206, a first BFD packet that prompts endpoint device 206 to at least partially disable the interface of endpoint device 206. In another example, sending module 106 may, as part of MEP 302 in FIG. 3, send, to MEP 306, a first BFD packet that prompts MEP 306 to at least partially disable UNI 314.

The systems described herein may perform step 420 in a variety of ways and/or contexts. In some examples, sending module 106 may establish, identify, and/or configure a BFD session between the computing device that hosts MEP 302 (e.g., endpoint device 202) and the computing device that hosts MEP 306 (e.g., endpoint device 206). For example, sending module 106 may establish a BFD session over a link or connection between endpoint device 202 and endpoint device 206. In one embodiment, this link or connection may be MPLS connection 304. For example, even when Layer 2 services are disabled at MEP 302 and MEP 306, the MPLS LSP between the devices that host MEP 302 and MEP 306 may be capable of transmitting BFD packets.

Sending module 106 may establish the BFD session in any suitable manner, such as via a three-way handshake and/or authentication mechanism. Moreover, sending module 106 may establish the BFD session at any suitable point in time before or after the failure within UNI 312 is detected. For example, sending module 106 may maintain a BFD session over MPLS connection 304 while Layer 2 services at MEP 302 and MEP 306 are functional. In this example, sending module 106 may periodically send one or more BFD packets (e.g., one or more Hello or Echo packets) to endpoint device 206 to verify the BFD session. In some embodiments, sending module 106 may also receive one or more BFD packets from endpoint device 206. Alternatively, sending module 106 may establish a BFD session between endpoint device 202 and endpoint device 206 in response to detecting the failure within UNI 312.

Sending module 106 may include a variety of information within the BFD packet sent to endpoint device 206. In some examples, sending module 106 may include, within the BFD packet, an indication that one or more UNIs of MEP 302 are experiencing a failure. For example, the BFD packet may include a UNI status such as "down" or "offline." In addition, sending module 106 may include an identification of UNI 312 and/or MEP 302 within the BFD packet. For example, sending module 106 may include an MEP identification (e.g., an MEP ID) of UNI 312 within the BFD packet. In some examples, a user, network administrator, and/or CFM session may assign an MEP ID to a UNI when initializing and/or configuring CFM services for the UNI. This MEP ID may uniquely identify the UNI within other UNIs that reside the same maintenance domain and/or are managed by the same maintenance association. In the event that multiple UNIs of MEP 302 are experiencing a connectivity failure, sending module 106 may include, within the BFD packet, an MEP ID of each of these UNIs. Additionally, in the event that the physical computing device that hosts MEP 302 is experiencing a failure, sending module 106 may include an identifier of the physical computing device within the BFD packet.

Sending module 106 may insert information about the connectivity failure within UNI 312 into the BFD packet in a variety of manners and/or formats. For example, sending module 106 may include the information within a header, payload, and/or additional field of the BFD packet. In one embodiment, sending module 106 may include the information within a type-length-value (TLV) field of the packet. The term "TLV field," as used herein, generally refers to any portion or unit of data that has been encoded into a packet using a TLV encoding scheme. A traditional TLV field may include a value element that includes variable content and/or is of variable size, a length element indicating the size of the value element, and a type element indicating the type of data within the value element. In one example, sending module 106 may create an extended and/or expanded TLV field within the BFD packet. This extended TLV field may include one or more additional and/or expanded elements. In some embodiments, sending module 106 may include the MEP ID of UNI 312 within one element of the extended TLV field and the status of the UNI 312 within another element. In one example, an extended TLV field may be referred to as a UNI interface status (UST) TLV.

Figure 5:
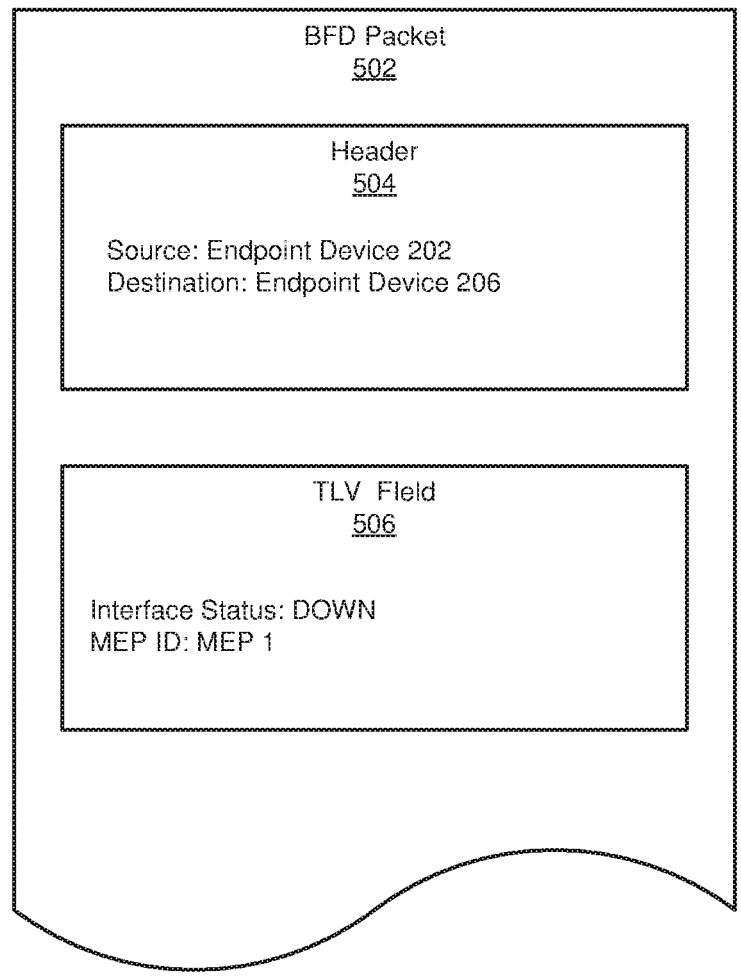
FIG. 5 is an illustration of an exemplary BFD packet that facilitates deadlock avoidance within MPLS networks.

FIG. 5 illustrates an exemplary BFD packet 502 that sending module 106 may send to the BFD session running on endpoint device 206. In this example, BFD packet 502 may include a header 504 that indicates that the source of BFD packet is endpoint device 202 and that the destination of BFD packet 502 is endpoint device 206. As shown in FIG. 5, BFD packet 502 may also include a TLV field 506. In one embodiment, TLV field 506 may represent and/or correspond to a UST TLV field. As shown in FIG. 5, TLV field may include an interface status of "down" and an MEP ID of "MEP 1" (e.g., the MEP ID of UNI 312).

After generating BFD packet 502, sending module 106 may forward BFD packet 502 to endpoint device 206 via the BFD session established between endpoint device 202 and endpoint device 206. In one example, sending module 106 may generate and forward BFD packet 502 immediately (e.g., as soon as possible) after the failure within UNI 312 is detected. In other examples, sending module 106 may forward BFD packet 502 in accordance with a certain schedule or heartbeat interval maintained by the BFD session. Furthermore, in some embodiments, sending module 106 may continue to periodically forward packets similar to BFD packet 502 (e.g., packets indicating that UNI 312 is down) to endpoint device 206 while UNI 312 is experiencing the connectivity failure.

In some embodiments, BFD packet 502 may be received at endpoint device 206 by an instance of sending module 106 operating within endpoint device 206. This instance of sending module 106 may process BFD packet 502 and/or send BFD packet 502 to the CFM session running within MEP 306 for processing. In some examples, the CFM session may determine that BFD packet 502 describes the operational state of UNI 312 based on extracting the MEP ID "MEP 1" from TLV field 506. Thus, the CFM session may execute a CFM action profile corresponding to the current operational state of UNI 312. In one embodiment, the CFM session may execute a CFM action profile that performs the action of disabling MPLS services at the peer UNI of UNI 312 (i.e., UNI 314) based on the event of UNI 312 being down. In the event that BFD packet 502 identifies multiple UNIs of MEP 302, the CFM session may execute a CFM action profile associated with each identified UNI. For example, the CFM session may disable each UNI of MEP 306 that is linked and/or connected to the identified UNIs. In the event that BFD packet 502 indicates that the physical computing device that hosts MEP 302 is non-operational, the CFM session may disable all or a portion of the physical computing device that hosts MEP 306.

In some embodiments, sending module 106 (running within endpoint device 206) may send one or more BFD packets to endpoint device 202 after the CFM session disables UNI 314. For example, sending module 106 may periodically generate and forward BFD packets indicating that UNI 312 is offline. More specifically, sending module 106 may transmit BFD packets that include the information shown in TLV field 506 of FIG. 5. In some embodiments, sending module 106 (running within endpoint device 202) may identify the MEP ID "MEP 1" within these BFD packets and then determine that no CFM action profile is currently applicable and/or should be executed. For example, sending module 106 may compare the MEP ID listed in a received BFD packet with the MEP IDs of the UNIs of MEP 302 (e.g., the local MEP IDs of MEP 302). In the event that the MEP ID within the received BFD packet matches one of the MEP IDs of the UNIs of MEP 302, the disclosed systems may ignore and/or disregard any and/or all CFM action profiles stored within MEP 302. In other words, BFD packets that include the MEP ID "MEP 1" and the interface status "down" may indicate, to MEP 302, that MEP 306 has disabled UNI 314 (rather than indicating that one or more actions should currently be performed in connection with UNI 312).

Returning to FIG. 4, at step 430 one or more of the systems described herein may determine that the connectivity failure has been corrected. For example, determination module 108 may, as part of endpoint device 202 in FIG. 2, determine that the connectivity failure within the interface of endpoint device 202 has been corrected. In another example, determination module 108 may, as part of MEP 302 in FIG. 3, determine that the connectivity failure within UNI 312 has been corrected.

The systems described herein may perform step 430 in a variety of ways and/or contexts. In some examples, determination module 108 may monitor UNI 312, MEP 302, and/or MPLS connection 304 to detect when UNI 312 becomes capable of transmitting packets between customer device 308 and MEP 302. For example, detection module 104 may periodically or continuously query, assess, or otherwise monitor the operational status of UNI 312. In one embodiment, detection module 104 may monitor UNI 312 directly (e.g., as part of software and/or hardware coupled to UNI 312). Additionally or alternatively, detection module 104 may monitor UNI 312 indirectly (e.g., by monitoring a CFM session within MEP 302 to detect when the CFM session generates a CCM indicating that UNI 312 is online).

In one example, determination module 108 may determine that the connectivity failure of UNI 312 has been corrected by determining that the cable of which UNI 312 is composed has been reconnected and/or repaired. In another example, determination module 108 may determine that software that facilitates operation of UNI 312 has been upgraded and/or rebooted. Additionally or alternatively, determination module 108 may facilitate correcting the connectivity failure of UNI 312. For example, determination module 108 may alert a network administrator of MEP 302 and/or customer device 308 about the connectivity failure of UNI 312. Determination module 108 may then determine that the network administrator has corrected the connectivity failure.

Returning to FIG. 4, at step 440 one or more of the systems described herein may re-establish Layer 2 services based on the MPLS connection by sending, to the second endpoint device, a second BFD packet that prompts the second endpoint device to re-enable the interface of the second endpoint device. For example, sending module 106 may, as part of endpoint device 202 in FIG. 2, re-establish Layer 2 services based on MPLS network 204 by sending, to endpoint device 206, a second BFD packet that prompts endpoint device 206 to re-enable the interface of endpoint device 206. In another example, sending module 106 may, as part of MEP 302 in FIG. 3, re-establish Layer 2 services based on MPLS connection 304 by sending, to MEP 306, a second BFD packet that prompts MEP 306 to re-enable UNI 314.

The systems described herein may perform step 440 in a variety of ways and/or contexts. In some examples, sending module 106 may generate a BFD packet that includes the MEP ID of UNI 312. In addition, this BFD packet may indicate that the connectivity failure within UNI 312 has been corrected. For example, sending module 106 may indicate that the interface status of UNI 312 is "up" or "online." Sending module 106 may include this information within the BFD packet in any suitable manner, such as by encoding the information within a UST TLV field of the packet. Sending module 106 may then forward the BFD packet to endpoint device 206 via the BFD session established between endpoint device 202 and endpoint device 206. In one embodiment, sending module 106 may generate and forward the BFD packet immediately (e.g., as soon as possible) after detecting that the connectivity failure within UNI 312 has been corrected. Alternatively, sending module 106 may generate and forward the BFD packet in accordance with a schedule or heartbeat interval maintained by the BFD session.

In some embodiments, the BFD packet may be received at endpoint device 206 by an instance of sending module 106 operating within endpoint device 206. This instance of sending module 106 may process the BFD packet and/or send the BFD packet to the CFM session running within MEP 306 for processing. In some examples, the CFM session may determine that the BFD packet describes the operational state of UNI 312 based on extracting the MEP ID "MEP 1" from a TLV field of the BFD packet. Thus, the CFM session may execute a CFM action profile corresponding to the current operational state of UNI 312. In one embodiment, the CFM session may execute a CFM action profile that performs the action of re-enabling MPLS services at UNI 314 based on the event of UNI 312 being up.

After re-enabling UNI 314, sending module 106 (running within endpoint device 206) may send one or more BFD packets to endpoint device 202 indicating that UNI 314 has been re-enabled. For example, sending module 106 may generate and transmit a BFD packet that includes the MEP ID "MEP 2" and the interface status "up." In some embodiments, this BFD packet may not trigger the CFM session running within MEP 302 to execute a CFM action profile. For example, the BFD packet may simply indicate, to MEP 302, that UNI 314 is operational (rather than indicating one or more actions that should currently be performed in connection with UNI 312).

After MEP 302 receives this BFD packet, both MEP 302 and MEP 306 may know that both UNI 312 and UNI 314 are online. Thus, MEP 302 and MEP 306 may resume communicating via Layer 2 services based on MPLS connection 304. For example, the CFM sessions running within MEP 302 and MEP 306 may resume (or continue) transmitting CCMs indicating the operational status of UNIs 312 and 314 (as well as any other UNIs of the MEPs). In addition, customer device 308 and customer device 310 may resume communicating via MPLS connection 304 (e.g., in addition to or instead of MPLS connection 318).

In some embodiments, the disclosed systems may maintain the BFD session running between endpoint device 202 and endpoint device 206 after Layer 2 services based on MPLS connection 304 are re-enabled. For example, endpoint device 202 and endpoint device 206 may continue to periodically transmit BFD packets to one another. Alternatively, the disclosed systems may terminate the BFD session (and then re-establish the BFD session in response to another connectivity failure).

Figure 6:
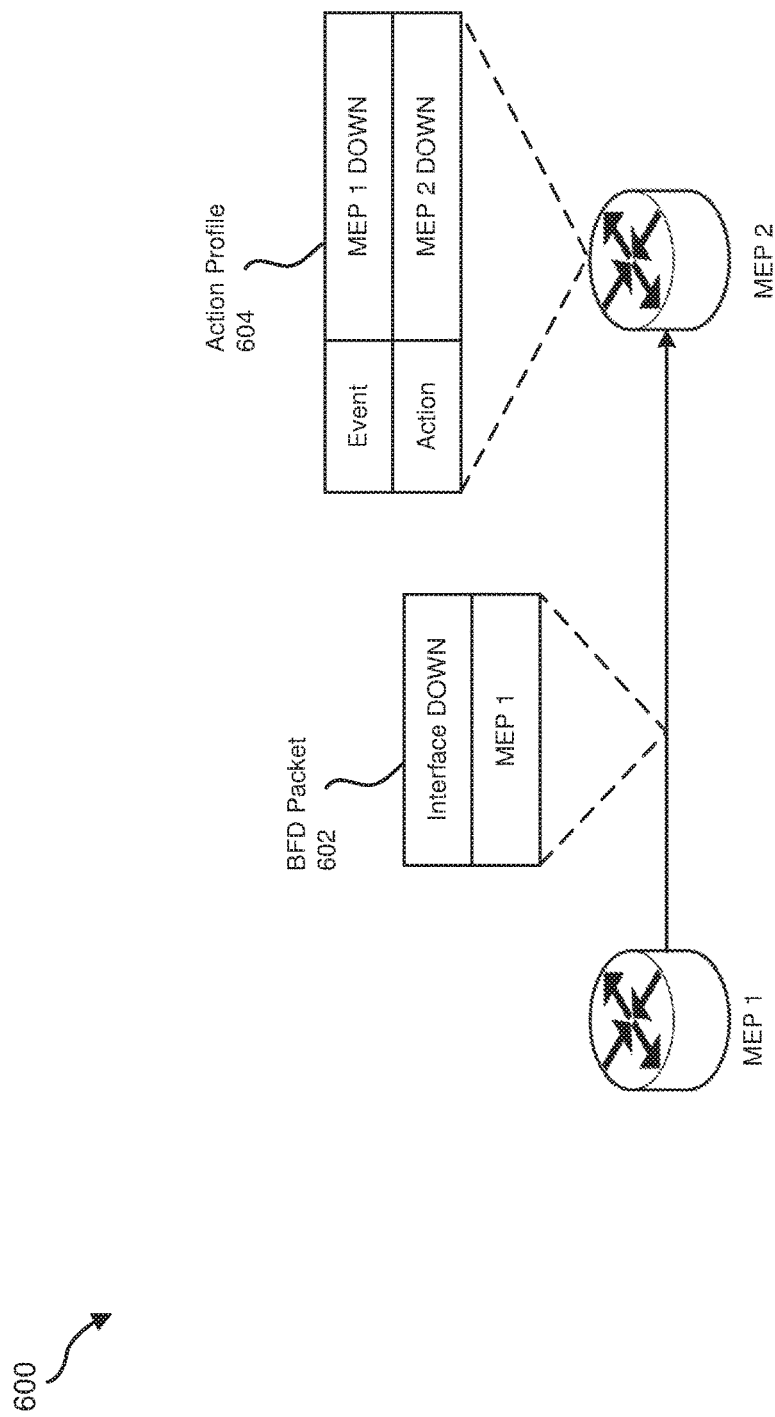
FIG. 6 is an illustration of an exemplary implementation for deadlock avoidance within MPLS networks.

FIGS. 6-9 illustrate exemplary implementations of the disclosed systems. These implementations describe the operation of two MEPs (i.e., MEP 1 and MEP 2). In these implementations, MEP 1 and MEP 2 may refer to and/or represent both the MEPs and the devices that host the MEPs (e.g., the devices that maintain a BFD session). In these implementations, MEP 1 may include a UNI with an MEP ID of "MEP 1". In addition, MEP 2 may include a UNI with an MEP ID of "MEP 2." These UNIs may be connected by an MPLS link. In one embodiment, a CFM session running within MEP 1 may detect a connectivity failure that disrupts Layer 2 services based on the MPLS link. Implementation 600 in FIG. 6 illustrates exemplary actions performed by MEP 1 and MEP 2 after the connectivity failure is detected. In this example, MEP 1 may forward, to MEP 2, a BFD packet 602 that includes (1) the MEP ID "MEP 1" and (2) an interface status of "down." In implementation 600, MEP 2 may execute an action profile 604 based on the information within BFD packet 602. As shown in FIG. 6, action profile 604 may include the action of disabling the UNI of MEP 2 in response to the event of the UNI of MEP 1 being down.

Figure 7:
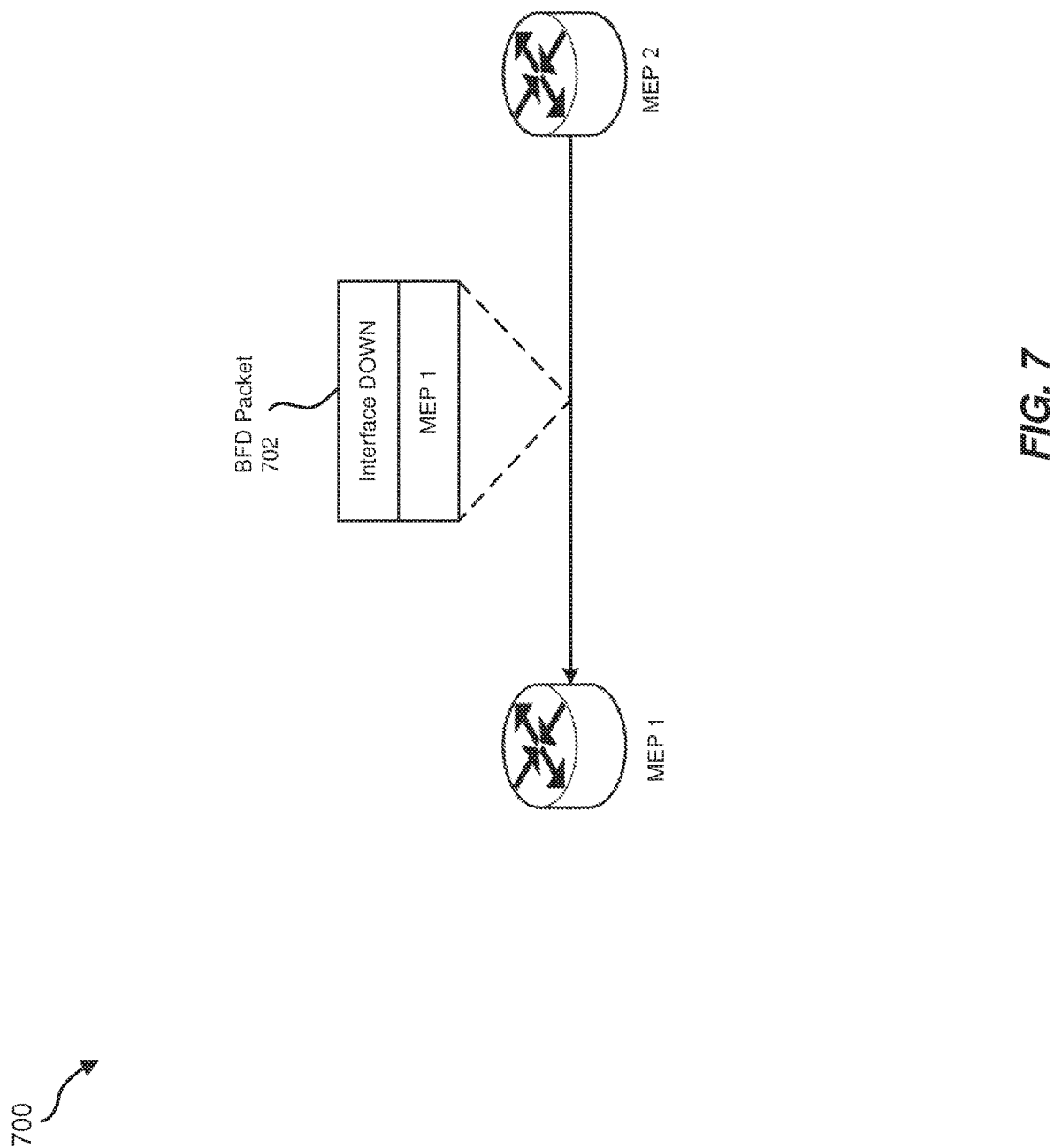
FIG. 7 is an illustration of an additional exemplary implementation for deadlock avoidance within MPLS networks.

Implementation 700 in FIG. 7 illustrates exemplary actions performed by MEP 1 and MEP 2 while the UNIs of MEP 1 and MEP 2 are down. In this example, MEP 2 may send, to MEP 1, a BFD packet 702 that includes (1) the MEP ID "MEP 1" and (2) an interface status of "down." In one embodiment, MEP 1 may determine that the MEP ID within BFD packet 702 corresponds to its own MEP ID. Thus, MEP 1 may determine that no action profile should be executed based on the information within BFD packet 702.

Figure 8:
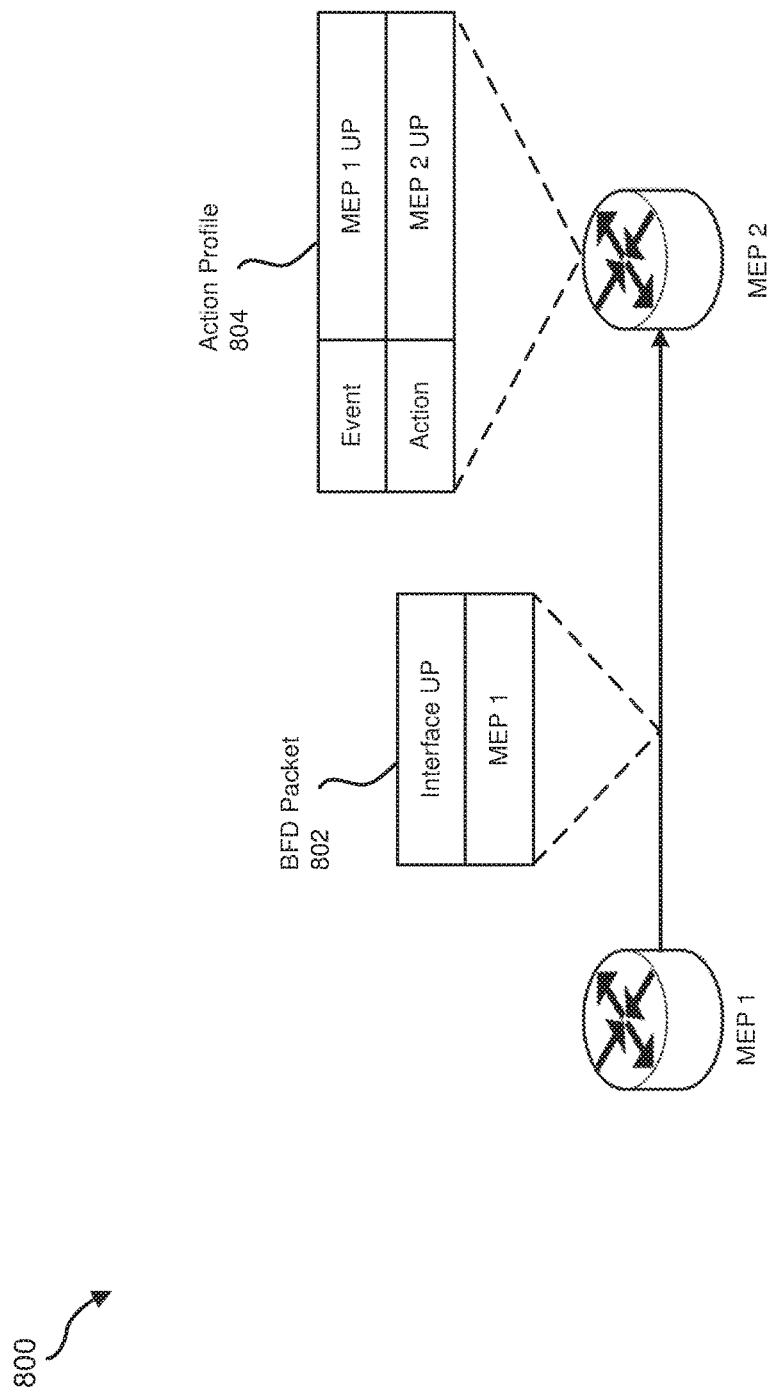
FIG. 8 is an illustration of an additional exemplary implementation for deadlock avoidance within MPLS networks.

Implementation 800 in FIG. 8 illustrates exemplary actions performed by MEP 1 and MEP 2 after the connectivity failure of the UNI of MEP 1 is corrected. In this example, MEP 1 may send, to MEP 2, a BFD packet 802 that includes (1) the MEP ID "MEP 1" and (2) an interface status of "up." In implementation 800, MEP 2 may execute an action profile 804 based on the information within BFD packet 802. As shown in FIG. 8, action profile 804 may include the action of re-enabling the UNI of MEP 2 in response to the event of the UNI of MEP 1 being up.

Figure 9:
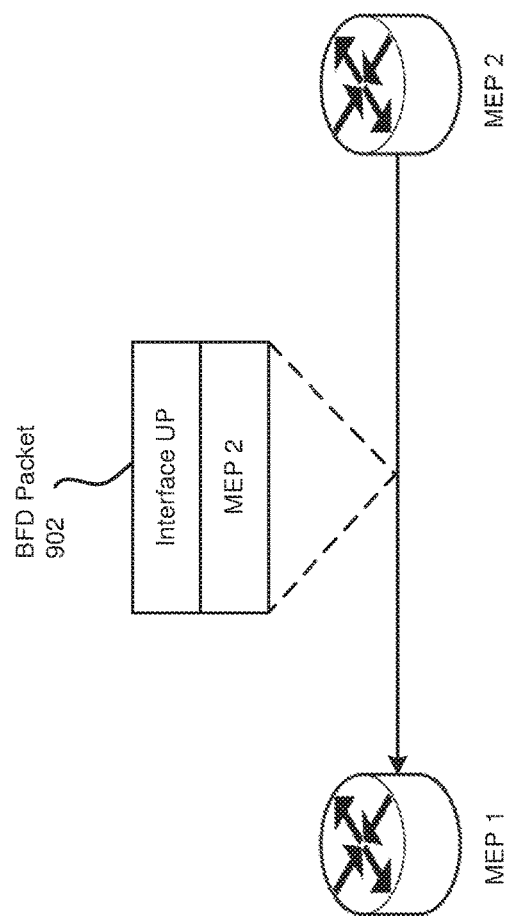
FIG. 9 is an illustration of an additional exemplary implementation for deadlock avoidance within MPLS networks.

Implementation 900 in FIG. 9 illustrates exemplary actions performed by MEP 1 and MEP 2 after the UNI of MEP 2 is re-enabled. In this example, MEP 2 may send, to MEP 1, a BFD packet 902 that includes (1) the MEP ID "MEP 2" and (2) an interface status of "up." While MEP 1 may determine that the MEP ID within BFD packet 902 does not match its own MEP ID, MEP 1 may determine that no action should be performed regarding the interface of MEP 1 due to the UNI already being up.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an application-specific integrated circuit (ASIC), a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

Figure 10:
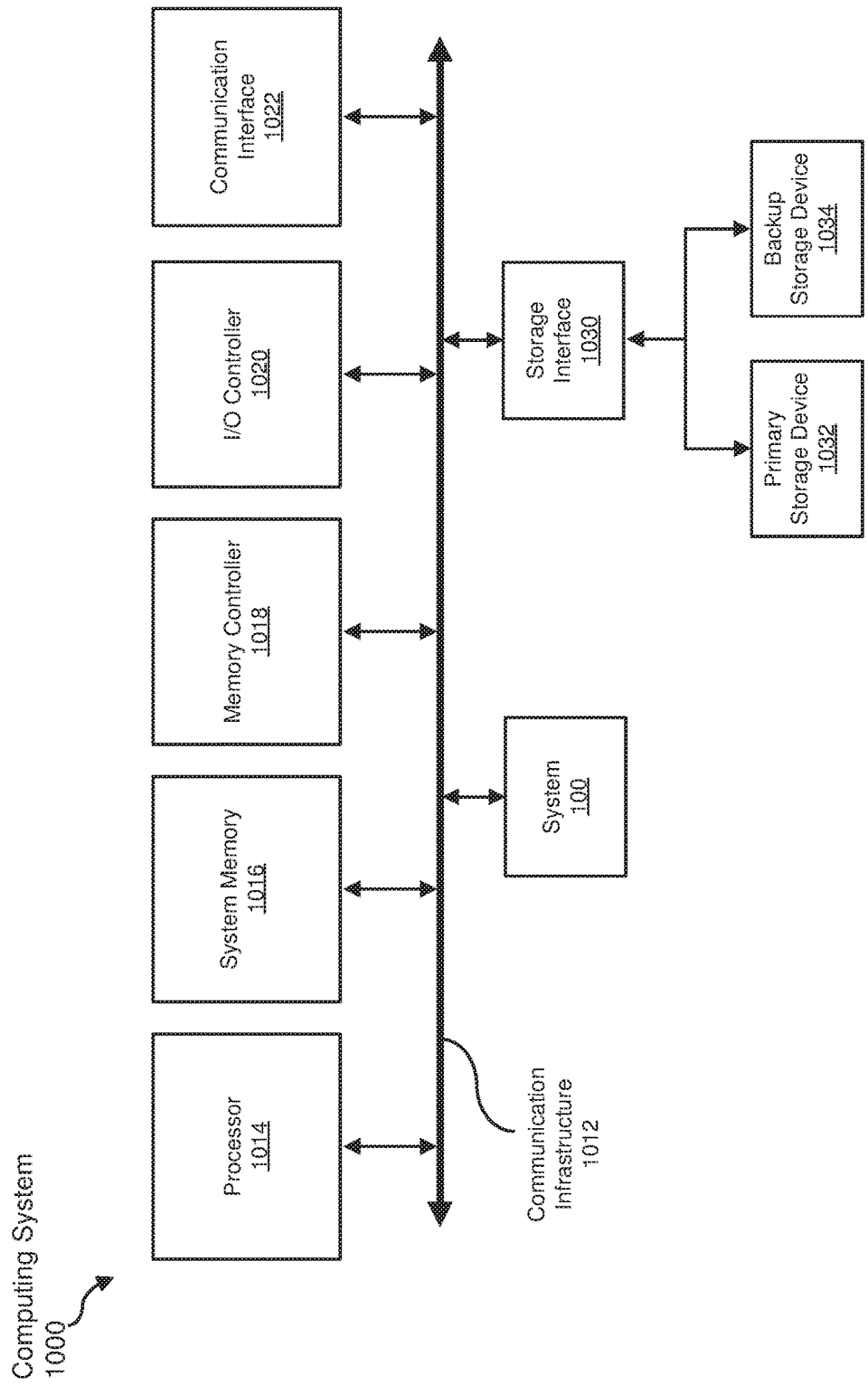
FIG. 10 is a block diagram of an exemplary computing system capable of implementing and/or being used in connection with one or more of the embodiments described and/or illustrated herein.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and 1/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   detecting, within an interface of a first endpoint device, a connectivity failure that disrupts a Layer 2 service based on a multiprotocol label switching (MPLS) connection between the interface of the first endpoint device and an interface of a second endpoint device;
   maintaining a bidirectional forwarding detection (BFD) session across the MPLS connection despite the connectivity failure that disrupts the Layer 2 service;
   in response to detecting the connectivity failure:
      generating a first BFD packet that includes, within a type-length-value (TLV) field of the first BFD packet, an identifier that identifies the interface of the first endpoint device and a status indicator that indicates that the interface of the first endpoint device is currently down, the TLV field of the first BFD packet being encoded using a TLV encoding scheme; and
      sending, to the second endpoint device via the BFD session, the first BFD packet to prompt the second endpoint device to at least partially disable the interface of the second endpoint device;
   determining that the connectivity failure has been corrected; and
   re-establishing the Layer 2 service based on the MPLS connection by:
      generating a second BFD packet that includes, within a TLV field of the second BFD packet, another identifier that identifies the interface of the first endpoint device and another status indicator that indicates that the interface of the first endpoint device is currently up, the TLV field of the second BFD packet being encoded using the TLV encoding scheme; and
      sending, to the second endpoint device via the BFD session, the second BFD packet to prompt the second endpoint device to re-enable the interface of the second endpoint device.

2. The method of claim 1, wherein:
   the interface of the first endpoint device connects the first endpoint device and a first user device;
   the interface of the second endpoint device connects the second endpoint device and a second user device; and
   detecting the connectivity failure comprises detecting a failure that disrupts communication between the first user device and the second user device.

3. The method of claim 1, wherein detecting the connectivity failure comprises detecting a failure that prevents one or more connectivity check messages (CCMs) from traversing between the interface of the first endpoint device and the interface of the second endpoint device via the MPLS connection.

4. The method of claim 1, wherein:
   sending the first BFD packet comprises including, within the first BFD packet, a device identifier of the first endpoint device; and
   the second endpoint device at least partially disables the interface of the second endpoint device based at least in part on identifying the device identifier of the first endpoint device within the first BFD packet.

5. The method of claim 4, further comprising receiving, from the second endpoint device after the second endpoint device at least partially disables the interface of the second endpoint device, a third BFD packet that includes the device identifier of the first endpoint device.

6. The method of claim 4, wherein:
the first endpoint device comprises a maintenance endpoint (MEP) device that runs a connectivity fault management (CFM) session; and
including the device identifier of the first endpoint device within the first BFD packet comprises including an MEP identifier of the first endpoint device.

7. The method of claim 4, wherein including the device identifier of the first endpoint device within the first BFD packet comprises:
extending the TLV field of the first BFD packet; and
inserting the device identifier of the first endpoint device into the extended TLV field.

8. The method of claim 4, wherein:
sending the second BFD packet to the second endpoint device comprises including, within the second BFD packet, the device identifier of the first endpoint device; and
the second endpoint device re-enables the interface of the second endpoint device based at least in part on identifying the device identifier of the first endpoint device within the second BFD packet.

9. The method of claim 1, wherein sending the first BFD packet to the second endpoint device triggers a CFM session running within the second endpoint device to execute a first action profile that takes the interface of the second endpoint device offline.

10. The method of claim 9, wherein sending the second BFD packet to the second endpoint device triggers the CFM session running within the second endpoint device to execute a second action profile that brings the interface of the second endpoint device online.

11. A system comprising:
at least one non-transitory memory;
a detection module, stored in the at least one non-transitory memory, that detects, within an interface of a first endpoint device, a connectivity failure that disrupts a Layer 2 service based on a multiprotocol label switching (MPLS) connection between the interface of the first endpoint device and an interface of a second endpoint device;
a determination module, stored in the at least one non-transitory memory, that determines that the connectivity failure has been corrected;
a sending module, stored in the at least one non-transitory memory, that:
maintains a bidirectional forwarding detection (BFD) session across the MPLS connection despite the connectivity failure that disrupts the Layer 2 service;
in response to the detection of the connectivity failure:
generates a first BFD packet that includes, within a type-length-value (TLV) field of the first BFD packet, an identifier that identifies the interface of the first endpoint device and a status indicator that indicates that the interface of the first endpoint device is currently down, the TLV field of the first BFD packet being encoded using a TLV encoding scheme;
sends, to the second endpoint device via the BFD session, the first BFD packet to prompt the second endpoint device to at least partially disable the interface of the second endpoint device; and
in response to determining that the connectivity failure has been corrected, re-establishes the Layer 2 service based on the MPLS connection by:
generating a second BFD packet that includes, within a TLV field of the second BFD packet, another identifier that identifies the interface of the first endpoint device and another status indicator that indicates that the interface of the first endpoint device is currently up, the TLV field of the second BFD packet being encoded using the TLV encoding scheme; and
sending, to the second endpoint device via the BFD session, the second BFD packet to prompt the second endpoint device to re-enable the interface of the second endpoint device; and
at least one hardware processor configured to execute the detection module, the determination module, and the sending module.

12. The system of claim 11, wherein:
the interface of the first endpoint device connects the first endpoint device and a first user device;
the interface of the second endpoint device connects the second endpoint device and a second user device; and
the detection module detects a failure that disrupts communication between the first user device and the second user device.

13. The system of claim 11, wherein the detection module detects a failure that prevents one or more connectivity check messages (CCMs) from traversing between the interface of the first endpoint device and the interface of the second endpoint device via the MPLS connection.

14. The system of claim 11, wherein:
the sending module includes, within the first BFD packet, a device identifier of the first endpoint device; and
the second endpoint device at least partially disables the interface of the second endpoint device based at least in part on identifying the device identifier of the first endpoint device within the first BFD packet.

15. The system of claim 14, wherein the sending module further receives, from the second endpoint device after the second endpoint device at least partially disables the interface of the second endpoint device, a third BFD packet that includes the device identifier of the first endpoint device.

16. The system of claim 14, wherein:
the first endpoint device comprises a maintenance endpoint (MEP) device that runs a connectivity fault management (CFM) session; and
the sending module includes an MEP identifier of the first endpoint device.

17. The system of claim 14, wherein the sending module:
extends the TLV field of the first BFD packet; and
inserts the device identifier of the first endpoint device into the extended TLV field.

18. The system of claim 14, wherein:
the sending module includes, within the second BFD packet, the device identifier of the first endpoint device; and
the second endpoint device re-enables the interface of the second endpoint device based at least in part on identifying the device identifier of the first endpoint device within the second BFD packet.

19. A non-transitory computer-readable medium comprising one or more computer-executable instructions that, when executed by at least one processor of a computing device, cause the computing device to:
detect, within an interface of a first endpoint device, a connectivity failure that disrupts a Layer 2 service based on an MPLS connection between the interface of the first endpoint device and an interface of a second endpoint device;

maintain a bidirectional forwarding detection (BFD) session across the MPLS connection despite the connectivity failure that disrupts the Layer 2 service;

in response to detecting the connectivity failure:
generate a first BFD packet that includes, within a type-length-value (TLV) field of the first BFD packet, an identifier that identifies the interface of the first endpoint device and a status indicator that indicates that the interface of the first endpoint device is currently down, the TLV field of the first BFD packet being encoded using a TLV encoding scheme; and send, to the second endpoint device via the BFD session, the first BFD packet to prompt the second endpoint device to at least partially disable the interface of the second endpoint device;

determine that the connectivity failure has been corrected; and re-establish the Layer 2 service based on the MPLS connection by:
generating a second BFD packet that includes, within a TLV field of the second BFD packet, another identifier that identifies the interface of the first endpoint device and another status indicator that indicates that the interface of the first endpoint device is currently up, the TLV field of the second BFD packet being encoded using the TLV encoding scheme; and sending, to the second endpoint device via the BFD session, the second BFD packet to prompt the second endpoint device to re-enable the interface of the second endpoint device.

20. The method of claim 1, wherein maintaining the BFD session across the MPLS connection comprises maintaining the BFD session across the MPLS connection via a layer other than Layer 2.

* * * * *